United States Patent
Takeda et al.

(10) Patent No.: US 10,911,982 B2
(45) Date of Patent: Feb. 2, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qun Zhao, Beijing (CN); Xiaohang Chen, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/490,268

(22) PCT Filed: Mar. 2, 2017

(86) PCT No.: PCT/JP2017/008376
§ 371 (c)(1),
(2) Date: Aug. 30, 2019

(87) PCT Pub. No.: WO2018/201815
PCT Pub. Date: Sep. 7, 2018

(65) Prior Publication Data
US 2020/0015119 A1    Jan. 9, 2020

(51) Int. Cl.
*H04W 28/06*  (2009.01)
*H04W 28/04*  (2009.01)
*H04L 1/00*  (2006.01)
*H04L 1/18*  (2006.01)

(52) U.S. Cl.
CPC ............. *H04W 28/06* (2013.01); *H04L 1/001* (2013.01); *H04L 1/1812* (2013.01); *H04W 28/04* (2013.01)

(58) Field of Classification Search
CPC ............................. H04W 28/06; H04W 28/04
USPC ........................................................... 370/329
See application file for complete search history.

(56) References Cited

U.S. PATENT DOCUMENTS

| | | | |
|---|---|---|---|
| 2014/0314036 A1* | 10/2014 | Takeda | H04L 5/0048 370/329 |
| 2014/0321406 A1* | 10/2014 | Marinier | H04B 7/024 370/329 |
| 2014/0328260 A1* | 11/2014 | Papasakellariou | H04L 1/1861 370/329 |
| 2016/0128095 A1* | 5/2016 | Damnjanovic | H04L 5/0087 370/336 |

OTHER PUBLICATIONS

International Search Report issued in Application No. PCT/JP2017/008376, dated Apr. 11, 2017 (5 pages).
(Continued)

*Primary Examiner* — Angel T Brockman
(74) *Attorney, Agent, or Firm* — Osha Bergman Watanabe & Burton LLP

(57) ABSTRACT

The present invention is designed to prevent communication performance from dropping in long TTI when preemption of long TTI by short TTI occurs. According to one aspect of the present invention, a user terminal has a receiving section that receives downlink (DL) data based on downlink control information (DCI) in a first transmission time interval (TTI), a transmission section that transmits delivery acknowledgement information in response to the DL data, and a control section that controls timing of transmitting the delivery acknowledgement information when indication information regarding preemption of the first TTI by a second TTI shorter than the first TTI is received in the receiving section.

7 Claims, 15 Drawing Sheets

(56) References Cited

OTHER PUBLICATIONS

Written Opinion issued in International Application No. PCT/JP2017/008376, dated Apr. 11, 2017 (4 pages).
3GPP TS 36300 V8.12.0; "LTE; Evolved Universal Terrestrial Radio Access (E-UTRA) and Evolved Universal Terrestrial Radio Access Network (E-UTRAN); Overall description; Stage 2 (Release 8)" Apr. 2010, (153 pages).

\* cited by examiner

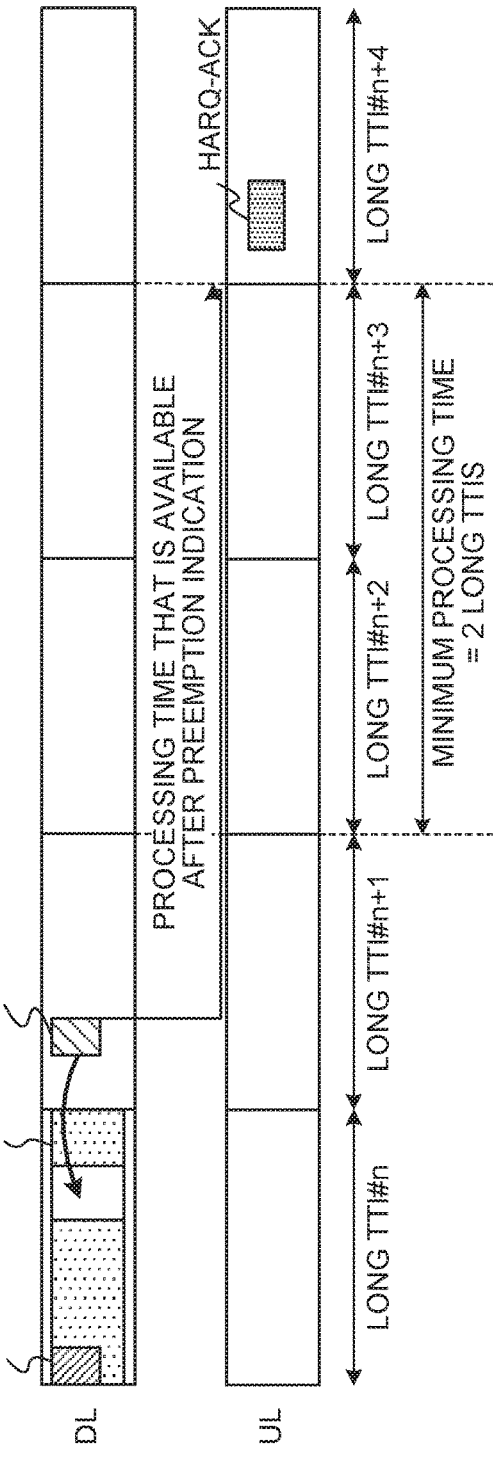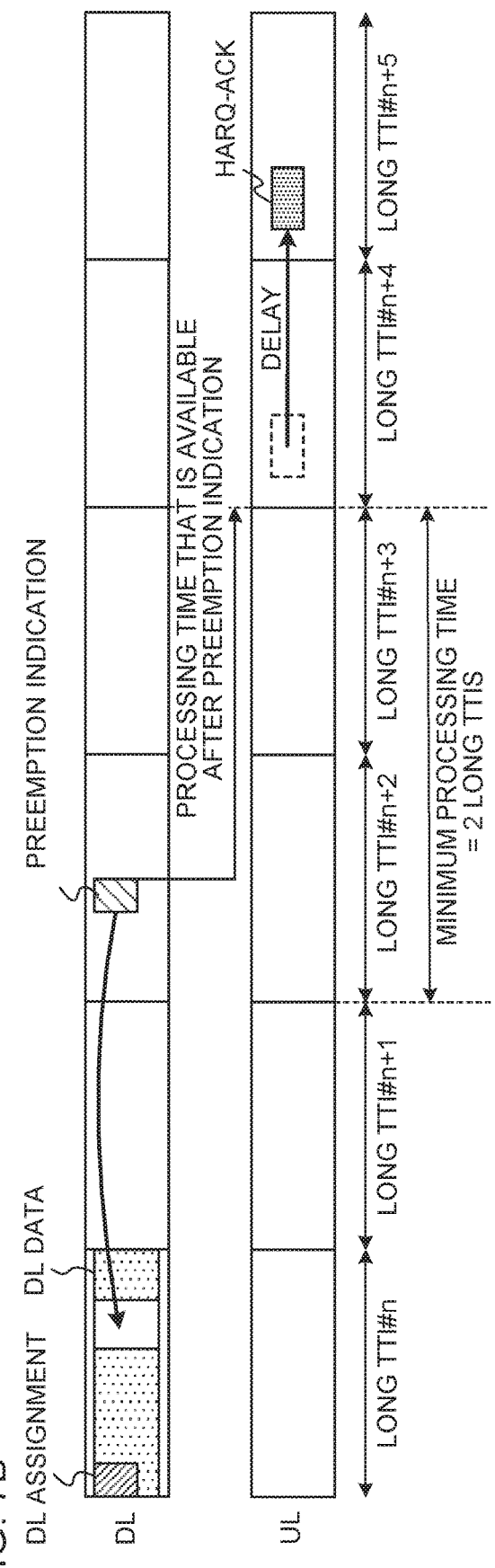

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate multiple carriers (component carriers (CCs), cells, etc.) is introduced in order to achieve broadbandization. Each carrier is configured with the system bandwidth of LTE Rel. 8 as one unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which multiple cell groups (CGs) formed by different radio base stations are configured in a user terminal, is also introduced. Each cell group is comprised of at least 1 cell (CC, cell, etc.). In DC, since multiple CCs of different radio base stations are integrated, DC is also referred to as "inter-eNB CA."

In existing LTE systems (for example, LTE Rels. 8 to 13), downlink (DL) and/or uplink (UL) communication are carried out using 1-ms transmission time intervals (TTIs). This 1-ms TTI is the unit of time to transmit 1 channel-encoded data packet, and is the processing unit in scheduling, link adaptation and so on. A TTI of 1 ms is also referred to as a "subframe," a "subframe duration" and/or the like.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April 2010

SUMMARY OF INVENTION

Technical Problem

Future radio communication systems (for example, 5G, NR, etc.) presume use cases characterized by, for example, high speed and large capacity (for example, eMBB (enhanced Mobile Broad Band)), a very large number of terminals (for example, massive MTC (Machine Type Communication)), ultra-high reliability and low latency (for example, ultra reliable and low-latency communications), and so on. For example, URLLC requires better latency reduction than in eMBB and/or higher reliability than in eMBB.

Thus, given that there is a possibility that a plurality of services having different requirements for latency reduction and/or reliability will be co-present in future radio communication systems, research is progress to support multiple TTIs of different time durations (for example, a TTI having a relatively long time duration (hereinafter referred to as a "long TTI," which is, for example, a TTI for eMBB), a TTI having a relatively short time duration (hereinafter referred to as a "short TTI," which is, for example, a TTI for URLLC), and so on).

When long TTIs and short TTIs are supported, short TTIs may be scheduled after the long TTIs start to be transmitted (that is Long TTI is preempted (preemption) by short TTI), in order to reduce latency and/or to meet the reliability requirements.

Here, preemption means interrupting long TTI being transmitted and inserting a short TTI, paraphrased as interrupting, hollowing out, puncturing a long TTI, or paraphrased as interrupting short TTI. The preemption may occur in a specific data sequence unit (for example, in code block, transport block and codeword units), which constitutes data to be allocated in the long TTI. Alternatively, the radio base station interrupts transmission of preemption long TTI and inserts short TTI, but the user terminal may assume that the preemption occurs in a particular data sequence unit (for example, in code block, transport block and codeword units), which constitutes the data allocated in the long TTI.

However, when preemption of a long TTI by a short TTI occurs, the communication performance (for example, eMBB performance) may drop in the long TTI.

The present invention has been made in view of the above, and it is therefore an object of the present invention to provide a user terminal and a radio communication method, whereby when a long TTI preemption by a short TTI occurs, it is possible to prevent the communication performance from dropping in the long TTI.

Solution to Problem

According to one aspect of the present invention, a user terminal has a receiving section that receives downlink (DL) data based on downlink control information (DCI) in a first transmission time interval (TTI), a transmission section that transmits delivery acknowledgement information in response to the DL data, and a control section that controls timing of transmitting the delivery acknowledgement information when indication information regarding preemption of the first TTI by a second TTI shorter than the first TTI is received in the receiving section.

Advantageous Effects of Invention

According to the present invention, when preemption of a long TTI by a short TTI occurs, a drop in the communication performance in the long TTI can be prevented.

BRIEF DESCRIPTION OF DRAWINGS

FIGS. 7A and 7B provide diagrams to show an example of control of HARQ timing according to a third example of the present invention;

DESCRIPTION OF EMBODIMENTS

Figure 1:
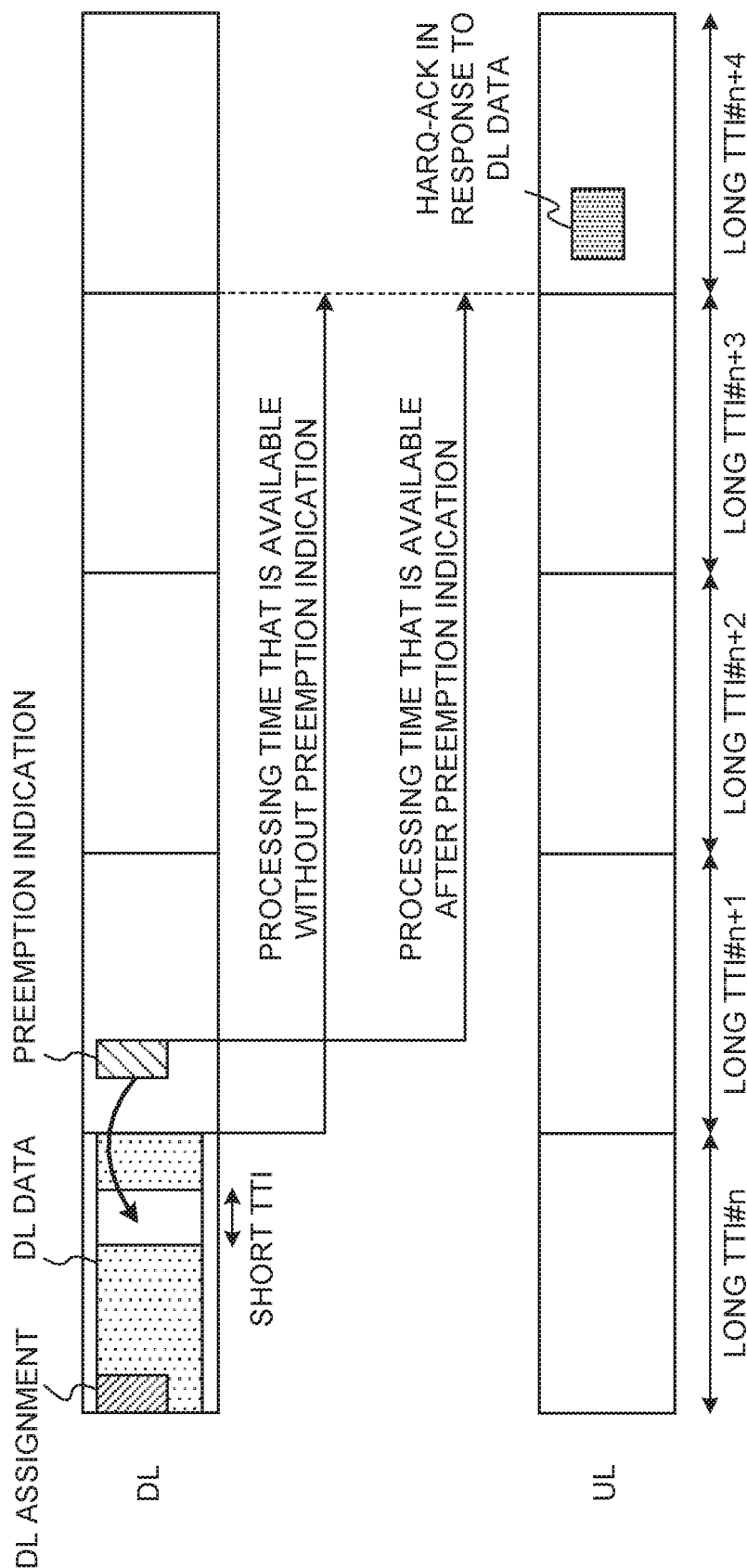
FIG. 1 is a diagram to show an example of preemption.

Envisaging future radio communication systems (for example, 5G, NR), studies are underway to select (specify) the time gap (time) between the timing of receiving downlink control information (also referred to as "DCI," "DL assignment," "DL grant," etc.) used to schedule DL data and the timing of transmitting the DL data (DL data channel (for example, PDSCH (Physical Downlink Shared Channel))) from one or more values. To be more specific, one of one or more values configured by higher layer signaling is specified as the time gap by a predetermined field of DCI (the above DL assignment, or DCI that is common to one or more user terminals (common DCI)).

Furthermore, envisaging future radio communication systems, studies are underway to select the time gap between the timing of receiving DCI (UL data channel (for example, PUSCH (Physical Uplink Shared Channel))) used to schedule UL data (also referred to as "UL Grant," "UL Assignment," etc.) and the timing of transmitting the UL data from one or more values. To be more specific, one of one or more values configured by higher layer signaling is specified as the time gap by a predetermined field of DCI (the above UL Grant, or common DCI).

In addition, for future radio communication systems, research is underway to select the time gap between the timing of receiving DL data and the timing of transmitting the delivery acknowledgement information (also referred to as "HARQ-ACK (Hybrid Automatic Repeat reQuest-ACKnowledgement)," "ACK/NACK (ACKnowledgement/Negative ACKnowledgement," "A/N," etc.) in response to the DL data from one or more values. To be more specific, one of one or more values configured by higher layer signaling is specified as the time gap by a predetermined field of DCI (the above DL assignment, or common DCI).

Also, in future radio communication systems, it is assumed that the user terminal supports one or more minimum HARQ processing times. It is also assumed that different minimum HARQ processing times may be supported among multiple user terminals. Also, the user terminal may report the minimum HARQ processing time to the radio base station (GNB (gNodeB)) as the capability information of the user terminal.

Here, the HARQ processing time includes at least one of a time gap between the timing of receiving DL data and the timing of transmitting HARQ-ACK and a time gap (also referred to as "latency," "processing time," "time," etc.) between the timing of receiving UL grant and the timing of transmitting UL data. The HARQ processing time is also referred to as "HARQ timing," "processing time," "latency time," and the like. The minimum HARQ processing time may be, for example, the minimum value allowed as the HARQ processing time at the user terminal.

However, in future radio communication systems (for example, 5G, NR, etc.), there is a possibility that services that require high speeds and large capacity (for example, eMBB) and services that require ultra-high reliability and low latency (for example, URLLCC) will be supported.

For services like URLLC that require ultra-high reliability and low latency, short TTIs, which are TTIs having a relatively short time duration, are suitable. This is so because short TTIs support high reliability (that is, retransmission in a short time) by providing short end-to-end latency (for example, frame fragmentation latency, transmission (Tx) latency, and so on) and/or short round-trip time.

On the other hand, for services like eMBB that require high-speeds and large capacity, long TTIs, which are TTIs having a relatively long time duration, are suitable. This is so because there is little control signal-induced overhead in long TTIs.

Therefore, a study is in progress to support long TTIs and short TTIs of varying time durations at the same time (in the same carrier (cell, component carrier (CC), etc.) in future radio communication systems. A long TTI may be constituted, for example, by fourteen symbols, at a subcarrier spacing of 15 kHz, using a normal cyclic prefix (NCP).

Also, a short TTI may be formed with a smaller number of symbols than a long TTI, at the same subcarrier spacing as the long TTI (for example, 1 or 2 symbols at a subcarrier spacing of 15 kHz, using NCP). Alternatively, a short TTI may be formed with the same or a different number of symbols than a long TTI, at a higher (wider) subcarrier spacing as than the long TTI (for example, fourteen symbols at a subcarrier spacing of 60 kHz, using NCP). Alternatively, a short TTI may be realized by combining both of these.

When a long TTI and a short TTI are supported, it might occur that a short TTI is scheduled after transmission is started in a long TTI so as to meet the demand for latency reduction and/or reliability. To be more specific, it may be possible to preempt (words such as "hollow out" and "puncture" may also be used) a part of long TTI DL data (for example, eMBB, hereinafter, also referred to as "long TTI data") and insert short TTI DL data (for example, URLLC, hereinafter referred to as "short TTI data").

When part of a long TTI is preempted by a short TTI, a user terminal that receives the long TTI data may not be able to demodulate (and/or decode) the long TTI data properly. Therefore, research is underway to transmit the indication information (also referred to as "preemption indication," "punctured resource information," "impacted resource information," etc.) related to the long TTI preemption by the short TTI to the user terminal using the long TTI.

Here, preemption indication may represent any information as long as it is information related to preemption. For example, the preemption indication may show at least one of the occurrence of preemption, the radio resource (for example, time and/or frequency resources) in which preemption occurs, the location of DL data (for example, the index of the code block (CB) that constitutes the DL data (transport block (TB))) in which preemption occurs, and the like.

FIG. 1 is a diagram to show an example of preemption. For example, referring to FIG. 1, in long TTI #n, part of a long TTI is preempted by a short TTI. Also, in long TTI #n+1, preemption indication is transmitted from the radio base station to the user terminal. Note that the timing of transmitting and receiving the preemption indication is not limited to #n+1. For example, the preemption indication may be transmitted and received in part of a time period overlapping with the data of the long TTI, or may be transmitted and received after #n+1.

In the case of FIG. 1, for example, the user terminal may replace the log likelihood ratio (LLR) of the data field that the preemption indication specifies, with 0, among the long TTI data received in long TTI #n, and demodulate (and/or decode) the long TTI data. By this means, the demodulation (and/or decoding) of the long TTI data can be prevented from failing due to the preemption.

Generally, when receiving long TTI data in long TTI #n, the user terminal can start demodulation (and/or decoding) immediately after receiving the long TTI data. Meanwhile, as shown in FIG. 1, when the preemption indication associated with long TTI data received in long TTI #n is transmitted a predetermined time after the long TTI data is received (in FIG. 1, long TTI #n+1), the user terminal can only demodulate (and/or decode) the long TTI data after receiving the preemption indication.

Therefore, when HARQ-ACK is transmitted at HARQ timing (for example, in FIG. 1, long TTI #n+4) indicated by DCI (for example, DL assignment or common DCI), as shown in FIG. 1, available processing time (available processing time) for long TTI data demodulation (and/or decode) varies depending on whether or not there is a preemption indication. For example, referring to FIG. 1, the available processing time is shorter when there is a preemption indication than when there is no preemption indication.

Thus, using HARQ timing indicated by the DCI when the preemption indication is received, processing time sufficient to demodulate (and/or decode) long TTI data based on the preemption indication cannot be reserved, so that the accuracy of data demodulation (and/or decoding) may be reduced. Therefore, when preemption indication is received, it is required to control the transmission timing of HARQ-ACK (hereinafter, also referred to as "HARQ timing") properly.

So, the present inventors have studied how to control HARQ timing when preemption indication is received, and arrived at the present invention. To be more specific, the present inventors have come up with the idea of keeping the HARQ timing indicated by DCI by controlling the timing of transmitting preemption indication from the radio base station (first example), and/or the idea of changing the HARQ timing indicated by the DCI when a preemption indication is received (second example).

Now, embodiments of the present invention will be described below in detail with reference to the accompanying drawings. Note that in the present embodiment, the "TTI" of the long TTI and the short TTI may be a predetermined time which is a unit of scheduling, and may be paraphrased as "subframe," "slot," "minislot," "subslot," and the like. Also, the user terminal of the present embodiment, may be a user terminal that can use long TTIs and short TTIs, or may be a user terminal that can only use either long TTIs or short TTIs.

Also, in the present embodiment, the HARQ timing is indicated by a predetermined field value of DCI. Note that, the predetermined field value of DCI may show the value of HARQ timing or may show one of a number of candidate values of HARQ timing, which is configured by higher layer signaling. Alternatively, the value of HARQ timing may be configured by higher layer signaling or fixedly determined in advance.

Also, in the present embodiment, "preemption indication" may be transmitted using a physical channel for preemption indication, may be included in the common DCI, may be included in DCI that schedules retransmitting data (DL assignment), or may be included in the MAC (Medium Access Control) control element. Moreover, in the present embodiment, "timing" may be a certain point in time or a time period having a certain width (for example, TTI, symbols, etc.).

First Example

In the first example of the invention, the user terminal transmits HARQ-ACK in response to the long TTI data (DL data of the first TTI) at the HARQ timing (transmission timing) indicated by the predetermined field value of DCI, regardless of whether or not the preemption indication is received. Note that the DCI may be DL assignment used to schedule the long TTI data, or may be a common DCI that is common to one or more user terminals.

In the first example, the user terminal may report (transmit), to the radio base station, capability information indicating whether or not the user terminal can receive the preemption indication.

Also, in the first example, regarding HARQ processing time, the user terminal may report (transmit), to the radio base station, capability information showing at least 2 types of processing times. For example, the first type of processing time may be a minimum HARQ processing time when no preemption indication is received. For example, the second type of processing time may be a minimum processing time after a preemption indication is received. Note that the processing time of the first and second types may be indicated by time (for example, milliseconds (ms), etc.) or by the number of TTIs (for example, long TTI, short TTI, or a combination of both).

In the first example, a radio base station controls transmission timing of preemption indication based on capability information (processing time of the above first and second types) reported from a user terminal. To be more specific, the radio base station may transmit a preemption indication from HARQ timing determined based on the first type of processing time earlier than the timing before the second type processing time (reference timing). Meanwhile, after the reference timing, the radio base station stops transmitting the preemption indication.

The user terminal anticipates receiving preemption indication if the processing time available after the preemption indication is greater than or equal to the processing time of the second type. The user terminal anticipates receiving preemption indication if the processing time available after the preemption indication is greater than or equal to the processing time of the second type.

Figure 2:
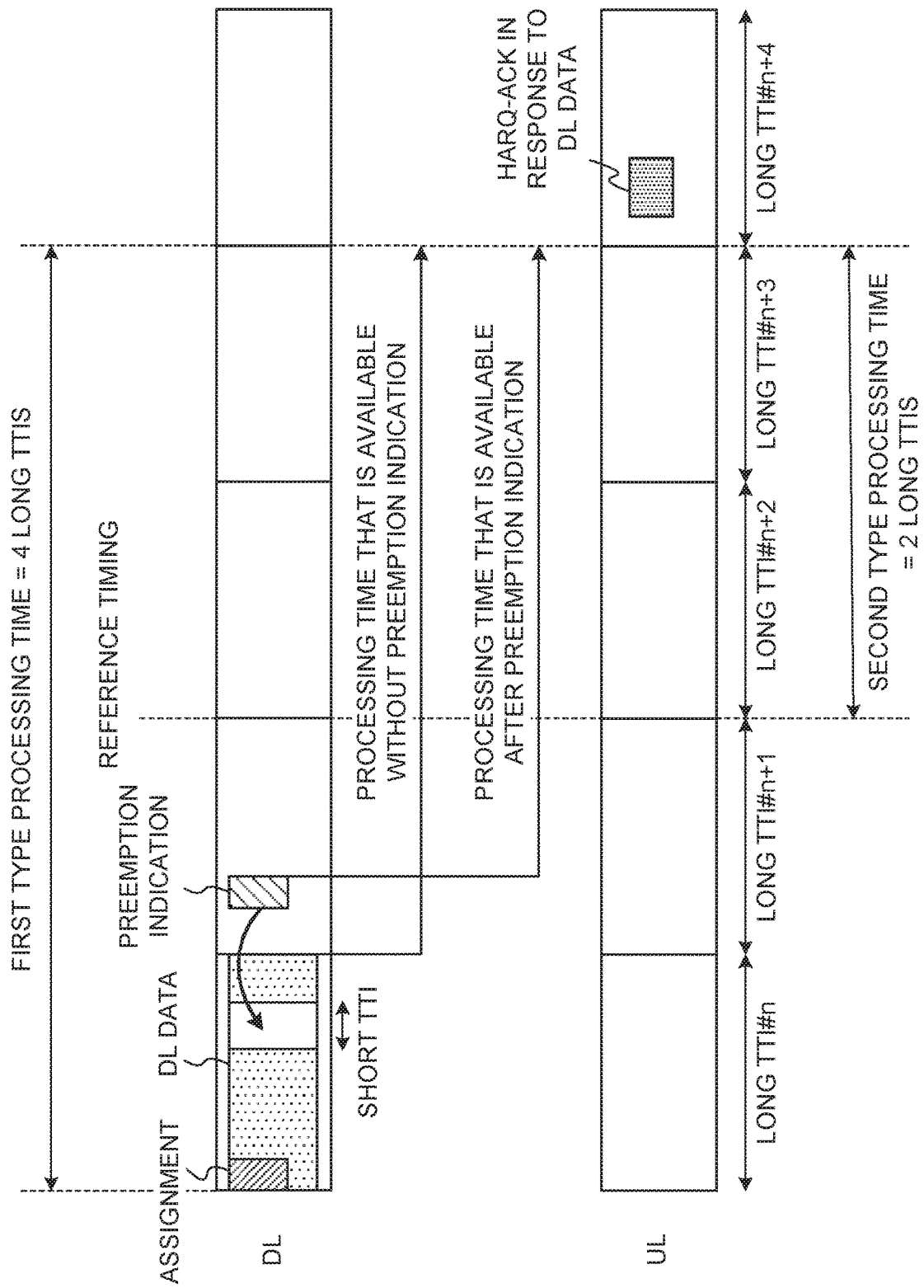
FIG. 2 is a diagram to show an example of control of HARQ timing according to a first example of the present invention.

FIG. 2 is a diagram to show a first example of control of HARQ timing according to a second example of the present invention. In FIG. 2, the user terminal reports, to the radio base station, the capability information showing that HARQ processing time taken from the timing when DL data is received to the timing HARQ-ACK is transmitted as the first-type processing time (4 long TTIs), and that the minimum processing time taken from the timing at which preemption indication is received to the timing at which HARQ-ACK is transmitted as the second-type processing time (2 long TTIs). Further, in FIG. 2, the timing 4 long TTIs later is designated as the HARQ timing by the predetermined field value of the DL assignment.

In FIG. 2, the radio base station transmits a preemption indication prior to a reference timing that is 2 long TTIs before long TTI #n+4 determined by the processing time of the first type. The user terminal starts demodulating (and/or decoding) long TTI #n DL data after the preemption indication is received, and transmits HARQ-ACK with HARQ timing (original transmission timing) indicated by the predetermined field value of DCI.

In the first example of the invention, a HARQ-ACK is transmitted at the HARQ timing indicated by the predetermined field value of DCI, regardless of whether or not the preemption indication is received. Thereby, control of HARQ timing in a user terminal can be simplified.

When the user terminal receives preemption indication, and the processing time available after the preemption indication is less than the processing time of the second type, the user terminal may not perform (may skip) the decoding process. In this case, the user terminal may transmit NACK at the designated HARQ-ACK transmission timing. By skipping the decoding process if there is a preemption indication, the battery consumption of the user terminal can be reduced. Also, if the user terminal skips the decoding process, by transmitting NACK at the designated HARQ-ACK timing, the base station can know that the user terminal has skipped decoding.

Alternatively, when the radio base station transmits the preemption indication when the processing time available after the preemption indication is less than the processing time of the second type, the user terminal transmits ACK/NACK at designated HARQ-ACK transmission timing, but there is a high possibility that the user terminal has not transmitted HARQ-ACK based on the proper decoding result. Alternatively, the radio base station can assume that the user terminal is transmitting a HARQ-ACK not based on the proper decoding result.

Second Example

In the second example of the invention, if the preemption indication is received by the user terminal, the user terminal transmits HARQ-ACK in response to the long TTI data (DL data of the first TTI) at a later transmission timing than the HARQ timing indicated by the predetermined field value of DCI.

In the second example, the user terminal may report (transmit), to the radio base station, capability information indicating whether or not the user terminal can receive the preemption indication.

Figure 3:
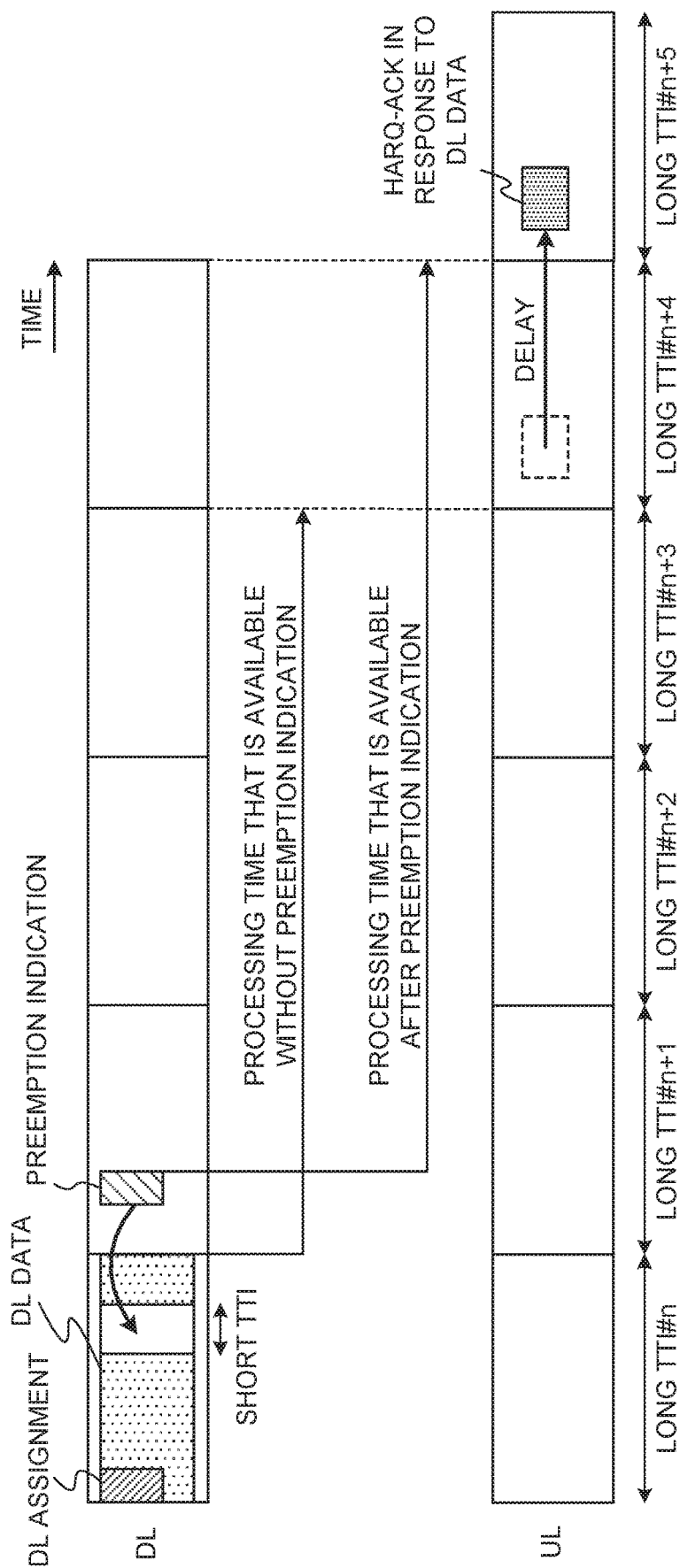
FIG. 3 is a diagram to show an example of control of HARQ timing according to a second example of the present invention.

FIG. 3 is a diagram to show an example of control of HARQ timing according to a second example. Further, in FIG. 3, the timing 4 long TTIs later is designated as the HARQ timing by the predetermined field value of the DL assignment. For example, in FIG. 3, when the preemption indication is received in long TTI #n+1, the user terminal may delay the timing of transmitting the HARQ-ACK from long TTI #n+4 to long TTI #n+5.

To be more specific, when a preemption indication is received, the user terminal may change the HARQ timing based on at least one of the preemption indication (first example of control), common DCI that is common to one or more user terminals (second example of control), and DCI used to retransmit at least a part of DL data (third example of control).

<First Example of Control>

According to the first example of control, when the preemption indication is received, the user terminal may change the HARQ timing (also referred to as "original transmission timing," "original HARQ-ACK transmission timing," etc.) indicated by the predetermined field value of DCI to the new transmission timing (also referred to as "new HARQ-ACK transmission timing," etc.) based on the preemption indication.

To be more specific, when the preemption indication is received, the user terminal determines a new transmission timing based on the transmission timing information included in the preemption indication. Here, the transmission timing information is information showing the new transmission timing. To be more specific, the transmission timing information may indicate a time determined based on at least one of HARQ timing indicated by a predetermined field value of DCI, timing at which preemption indication is received (or transmitted), and timing at which DL data is received (or transmitted).

For example, the transmission timing information may indicate a time T1 between the timing of receiving the preemption indication and the new transmission timing. For example, the transmission timing information showing time T1 may be an absolute value of the number of TTIs or symbols (or offset), or may be an index value showing one of a number of offsets configured by higher layer signaling.

In addition, the transmission timing information may indicate a time T2 between the original HARQ-ACK transmission timing and the new transmission timing. For example, the transmission timing information showing time T2 may be an absolute value of the number of TTIs or symbols (or offset), or may be an index value showing one of a number of offsets configured by higher layer signaling.

In addition, the transmission timing information may indicate a time T3 between the timing of receiving the DL data and the new transmission timing. For example, the transmission timing information showing time T3 may be an absolute value of the number of TTIs or symbols (or offset), or may be an index value showing one of a number of offsets configured by higher layer signaling.

Alternatively, when the preemption indication is received, the user terminal may determine (calculated by the user terminal) the new transmission timing based on the time a between the time of receiving the preempted DL data (and/or DCI) and the time of receiving the preemption indication.

Figure 4:
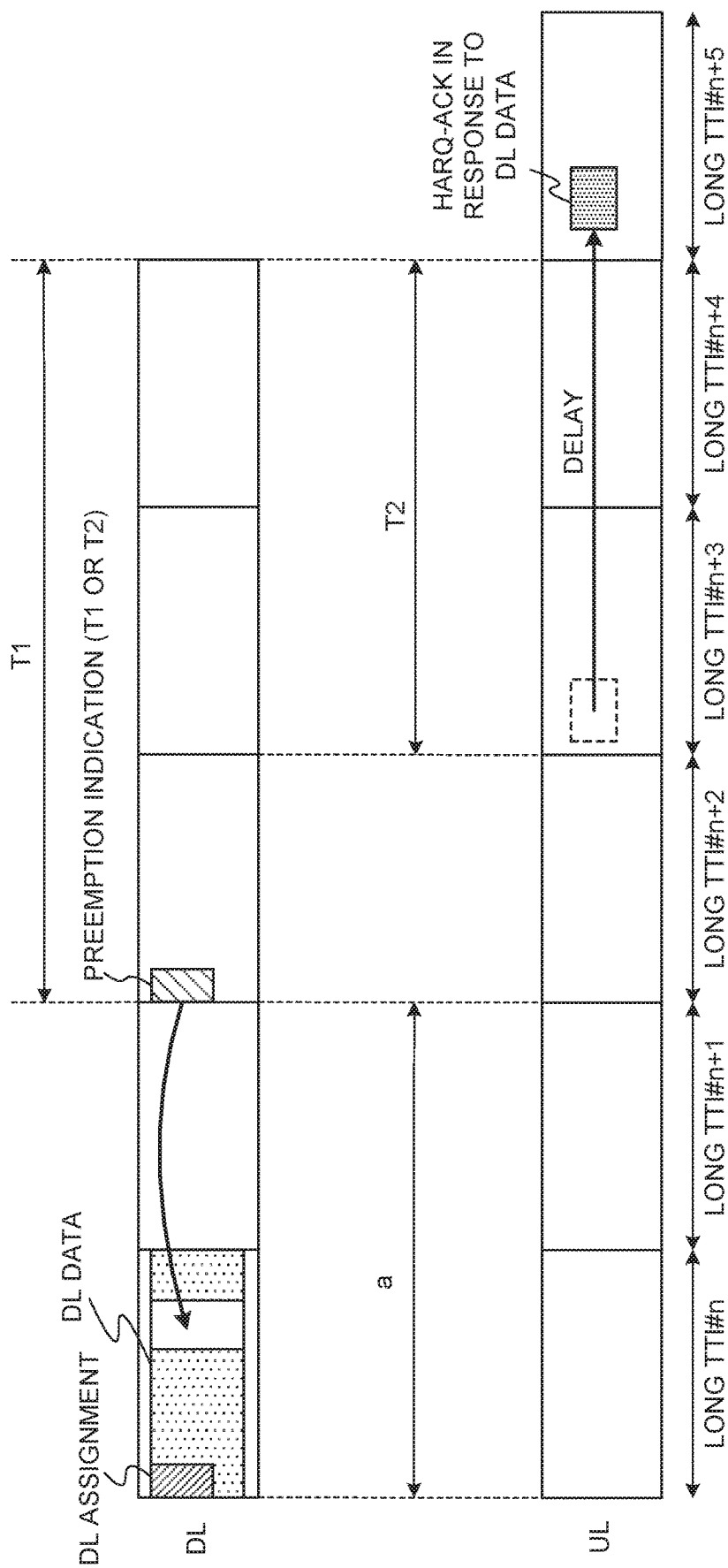
FIG. 4 is a diagram to show a first example of control of HARQ timing according to a second example of the present invention.

FIG. 4 is a diagram to show a first example of control of HARQ timing according to a second example of the present invention. Note that, in FIG. 4, the HARQ timing (original transmission timing) indicated by the predetermined field value of the DL assignment is 3 long TTIs later (long TTI #n+3).

For example, in FIG. 4, when the transmission timing information in the preemption indication indicates the time T1 (here, 3 long TTIs), the user terminal may designate long TTI #n+5 located after the time T1 from long TTI #n+1, in which the preemption indication is received, as the timing for transmitting the HARQ-ACK.

In addition, in FIG. 4, when the transmission timing information in the preemption indication indicates the time T2 (here 2 long TTIs), the user terminal may designate long TTI #n+5 located after the time T2 from the original transmission timing (long TTI #n+3) as the new transmission timing. In this case, the number of bits of transmission timing information can be reduced compared to the case where the transmission timing information indicates time T1.

In addition, in FIG. 4, when the preemption indication is received, the user terminal may designate long TTI #n+5 located after time a from the original transmission timing (long TTI #n+3) as the new transmission timing based on the time a between the time of receiving the preempted DL data (and/or DCI) and the time of receiving the preemption indication (here, 2 long TTIs). In this case, new transmission timing can be determined without signaling from the radio base station.

According to the first example of control, based on preemption indication, HARQ-ACK is transmitted at new transmission timing later than the original transmission timing, even in the case of receiving the preemption indication, it is possible to prevent the processing time available for DL data demodulation (and/or decoding) from being shortened, and to transmit the HARQ-ACK feedback properly.

<Second Example of Control>

In a second example of control, when preemption indication is received, the user terminal may change the original transmission timing to the new transmission timing based on the common DCI (also referred to as "common control information," "group DCI," "L1 control channel," etc.) common to one or more user terminals.

Figure 5:
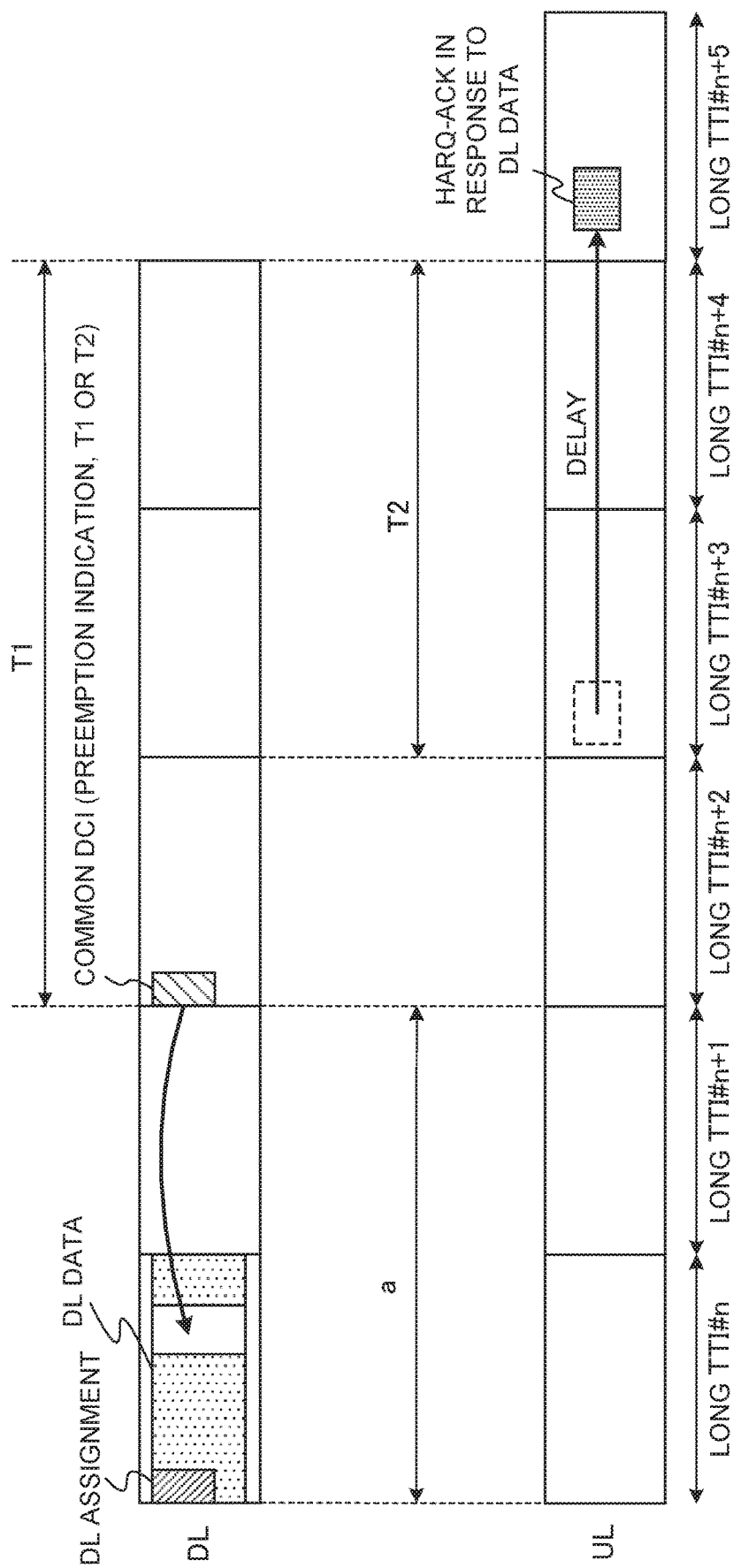
FIG. 5 is a diagram to show a second example of control of HARQ timing according to a second example of the present invention.

FIG. 5 is a diagram to show a second example of control of HARQ timing according to a second example of the present invention. Referring to FIG. 5, differences from FIG. 4 will be primarily described below. In FIG. 5, the user terminal receives the common DCI in long TTI #n+2.

The common DCI may be used as the preemption indication, the preemption indication may include information that shows at least one of the occurrence of preemption, the radio resource (for example, time and/or frequency resources) in which preemption occurs, the location of DL data (for example, the index of the CB that constitutes the DL data (TB)) in which preemption occurs, and the like. In addition, the common DCI may be used as the preemption indication, and may include transmission timing information that shows the preemption indication in long TTI #n and the time T1 or the time T2.

For example, in FIG. 5, when the transmission timing information in the common DCI indicates the time T1 (here, 3 long TTIs), the user terminal may designate long TTI #n+5 located after the time T1 from long TTI #n+2, in which the preemption indication is received, as the new transmitting timing. In this case, the DCI format for DL assignment can be reused for signaling of new transmission timing.

In addition, in FIG. 5, when the transmission timing information in the common DCI indicates the time T2 (here, 2 long TTIs), the user terminal may designate long TTI #n+5 located after the time T2 from the original transmission timing (long TTI #n+3) as the new transmission timing. In this case, the number of bits of transmission timing information can be reduced compared to the case where the transmission timing information indicates time T1.

In addition, in FIG. 5, when the common DCI used as the preemption indication is received, the long TTI #n+5 after the time a from the original transmission timing (long TTI #n+3) may be designated as the new transmission timing based on the time a (here, 2 long TTIs) between the time of receiving the preempted DL data (and/or DCI) and the time of receiving the common DCI. In this case, new transmission timing can be determined without signaling from the radio base station.

According to the second example of control, since HARQ-ACK is transmitted, based on common DCI used as preemption indication, at a new transmission timing later than the original transmission timing, even in the case of receiving the preemption indication, it is possible to prevent the processing time available for DL data demodulation (and/or decoding) from being shortened, and to transmit the HARQ-ACK feedback properly.

<Third Example of Control>

In a third example of control, DCI (DL assignment), which schedules retransmitting data for at least a part of preempted DL data, is used as the above preemption indication. In the third example of control, the user terminal may change the original transmission timing to the new transmission timing based on the DL assignment.

Figure 6:
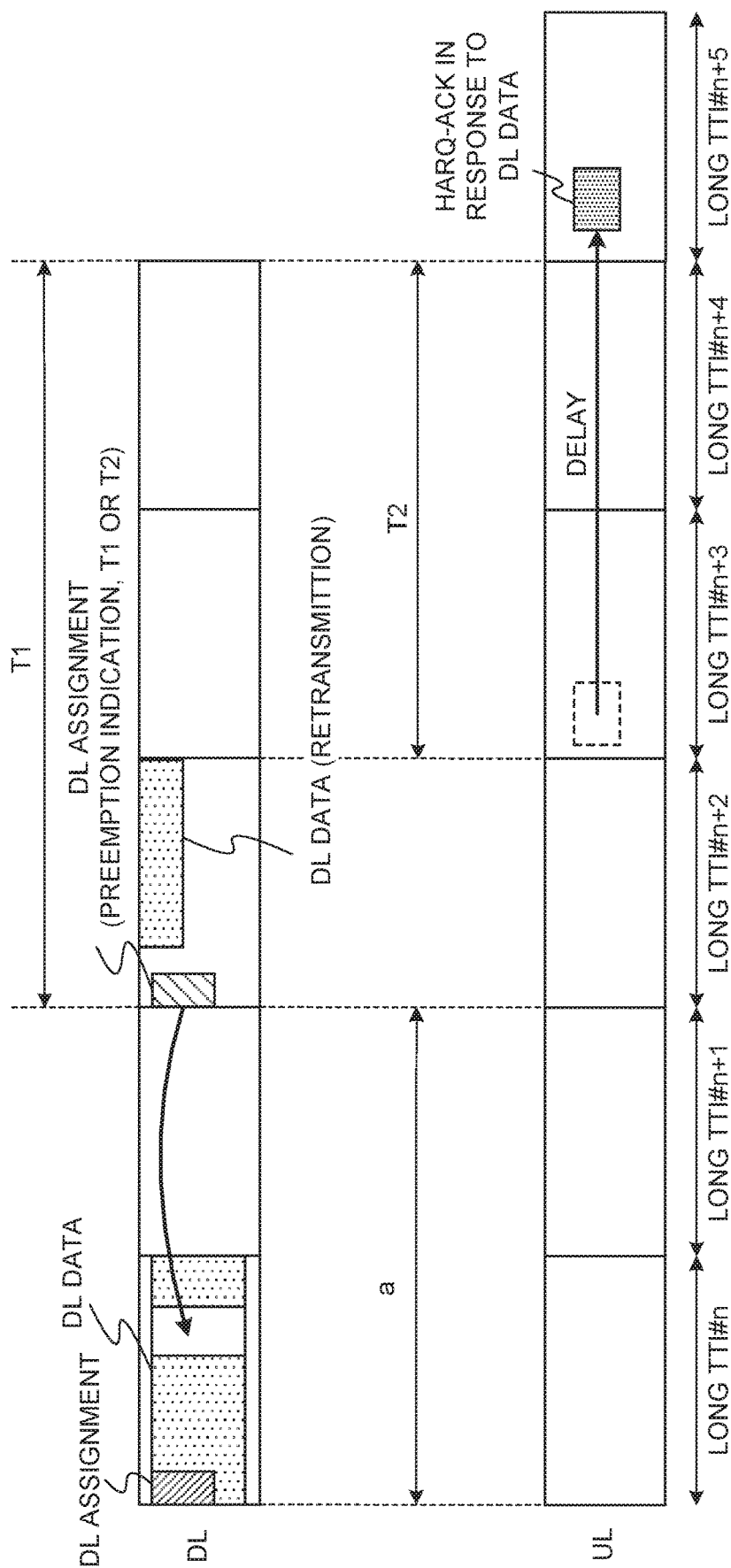
FIG. 6 is a diagram to show a third example of control of HARQ timing according to a second example of the present invention.

FIG. 6 is a diagram to show a third example of control of HARQ timing according to a second example of the present invention. Differences in FIG. 6 from FIGS. 4 and 5 will be primarily described below. In FIG. 6, DL data transmitted first in long TTI #n is preempted. Further, in FIG. 6, the radio base station transmits retransmitting data including at least a part of the DL data and DL assignment to schedule the relevant retransmitting data in long TTI #n+2 without HARQ-ACK from the user terminal.

The DL assignment for the retransmitting data may be used as the preemption indication, the preemption indication may show at least one of the occurrence of preemption, the radio resource (for example, time and/or frequency resources) in which preemption occurs, the location of DL data (for example, the index of the CB that constitutes the DL data (TB)) in which preemption occurs, etc.

Also, the DL assignment for the retransmitting data may include transmission timing information that indicates at least one of the time T1 and the time T2 described above. Note that, in FIG. 6, this DL assignment and retransmitting data are transmitted in long TTI #n+2, but may be transmitted at different timings.

For example, in FIG. 6, when the transmission timing information in the DL assignment for retransmitting data indicates the time T1 (here, 3 long TTIs), the user terminal may designate long TTI #n+5 located after the time T1 from the receiving timing (long TTI #n+2) of the DL assignment as the new transmission timing. In this case, the DCI format for DL assignment can be reused for signaling of new transmission timing.

In addition, in FIG. 6, when the transmission timing information in the DL assignment for retransmitting data indicates the time T2 (here, 2 long TTIs), the user terminal may designate long TTI #n+5 located after the time T2 from the original transmission timing (long TTI #n+3) as the new transmission timing. In this case, the number of bits of transmission timing information can be reduced compared to the case where the transmission timing information indicates time T1.

In addition, in FIG. 6, when the user terminal receives the DL assignment for the retransmitting data, the user terminal may designate the long TTI #n+5 located after the time a from the original timing (long TTI #n+3) as the new transmission timing based on the time a (here, 2 long TTIs) between the time of receiving the preempted DL data (and/or DCI) and the time of receiving the DL assignment. In this case, new transmission timing can be determined without signaling from the radio base station.

Also, in FIG. 6, when the user terminal stores DL data received in long TTI #n in a buffer, the user terminal may configure the LLR of the data field (for example, CB or TB, or a part thereof) indicated by the DL assignment for retransmitting data to zero. The user terminal may generate HARQ-ACK based on the result of combining DL data received in long TTI #n and retransmitting data in long TTI #n+2.

According to the third example of control, DL assignment for retransmitting data is used as preemption indication, so that the HARQ-ACK based on the result of combining the DL data of the initial transmission and the retransmitting data can be transmitted as feedback, and the accuracy of the HARQ-ACK feedback can be further improved. Furthermore, based on the DL assignment, HARQ-ACK is transmitted at new transmission timing later than the original transmission timing, and hence, it is possible to prevent the processing time available for DL data demodulation (and/or decoding) from being shortened, and to transmit the HARQ-ACK feedback properly.

Third Example

In the third example of the present invention, a combination of the first and second examples will be described. In the third example, the user terminal controls the timing of transmitting the HARQ-ACK based on the timing of receiving the preemption indication.

To be more specific, when the available processing time after the preemption indication is equal to or more than the predetermined time, the user terminal transmits a HARQ-ACK at the HARQ timing (original transmission timing) indicated by the predetermined field of the DCI. On the other hand, when the available processing time is less than the predetermined time after preemption indication, the user terminal transmits a HARQ-ACK at a timing later than the HARQ timing. Here, the predetermined time may be the minimum processing time at the user terminal and reported to the radio base station as the processing time of the second type.

FIG. 7 is a diagram to show a first example of control of HARQ timing according to a second example of the present invention. Further, in FIG. 7A and FIG. 7B, the timing 4 long TTIs later is designated as the HARQ timing by the predetermined field value of the DL assignment. Also, in FIGS. 7A and 7B, the minimum processing time at the user terminal is configured to 2 long TTIs.

In FIG. 7A, the processing time available after preemption indication is equal to or more than the minimum processing time, the user terminal transmits HARQ-ACK in long TTI #n+4 which is the original transmission timing.

In On the other hand, FIG. 7B, the processing time available after preemption indication is less than the minimum processing time, so that the user terminal changes the original transmission timing (long TTI #n+4) to a new transmission timing (long TTI #n+5), and transmits HARQ-ACK at this new transmission timing. Note that, the new transmission timing may be determined as described in the first to third examples of control according to the second example.

In the third example, the radio base station can transmit a preemption indication at a timing after the timing before the original transmission timing of HARQ-ACK by the minimum processing time (here, 2 long TTI), so that the restriction on the transmission of preemption indication in the radio base station can be reduced compared to the first example.

Fourth Example

As described in the second example of control according to the second example, a common DCI that is common to one or more user terminals may be used as the preemption indication. In a fourth example of the present invention, the case where the common DCI is used as a preemption indication to encompass a number of user terminals will be described.

In the fourth example, a number of user terminals using common DCI may have different capabilities (also referred to as "processing time" or "processing capability"). Also, the number of user terminals may have different HARQ timings. Also, the number of user terminals may have different original HARQ timings.

In the fourth example, when the common DCI is used as a preemption indication of a number of user terminals, the HARQ timing of each of the number of user terminals may be changed based on the offset common to the number of user terminals (common control).

Alternatively, even if the common DCI is used as a preemption indication to encompass multiple user terminals, each user terminal may determine the HARQ timing of each user terminal based on the capacity and/or the minimum HARQ timing of each user terminal (dedicated control).

<Common Control>

Figure 8:
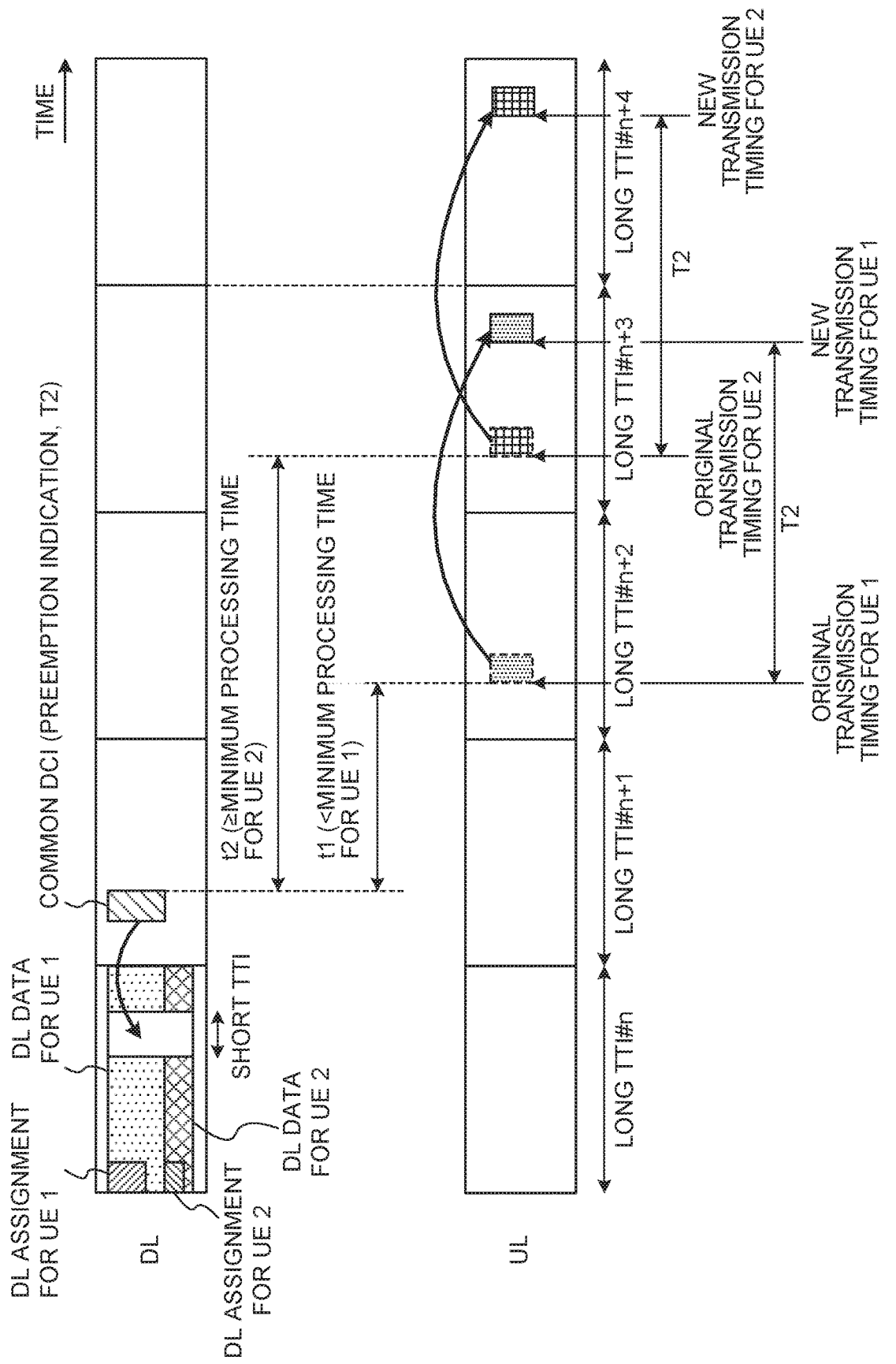
FIG. 8 is a diagram to show an example of common control of HARQ timing according to a fourth example of the present invention.

FIG. 8 is a diagram to show an example of common control of HARQ timing according to a fourth example of the present invention. In FIG. 8, DL data of user terminals (UE) 1 and 2 are transmitted in long TTI #n. Also, the DL data of the user terminals 1 and 2 of long TTI #n is preempted by the DL data. Also, in long TTI #n+1, the common DCI common to the user terminals 1 and 2 is transmitted as a preemption indication.

Furthermore, in FIG. 8, the HARQ timing (original HARQ timing) indicated by the predetermined field value of the DL assignment of user terminals 1 is 2 long TTIs later. On the other hand, the HARQ timing indicated by the predetermined field value of the DL assignment of user terminals 2 is 3 long TTIs later. Also, the minimum processing time (2nd type processing time) of user terminals 1 and 2 is 2 TTIs.

In FIG. 8, the time t1 from the timing at which the common DCI is received to the original HARQ timing in the user terminal 1 is shorter than the minimum processing time for the user terminal 1. In FIG. 8, the time t1 from the timing at which the common DCI is received to the original HARQ timing in the user terminal 1 is shorter than the minimum processing time for the user terminal 1.

As shown in FIG. 8, when common control is applied, regardless of whether or not the time t1 and/or t2 between the timing at which the common DCI is received and the original HARQ timing is less than the minimum processing time, the original transmission timing is changed to the new transmission timing based on the transmission timing information in the common DCI.

For example, in FIG. 8, transmission timing information in the common DCI shows offset (time T2 between original transmission timing and new transmission timing) common to the user terminals 1 and 2. Therefore, in FIG. 8, each of the user terminals 1 and 2 transmits an HARQ-ACK at a transmission timing that is delayed by a time T2 from the original transmission timing.

As shown in FIG. 8, when common control is applied, regardless of the times t1 and t2 from the timing when the common DCI is received to the original HARQ timing in the user terminal 1, the user terminals 1 and 2 may delay the HARQ timing based on the offset T2 indicated by the transmission timing information in the common DCI.

In FIG. 8, since the timing of transmitting the HARQ-ACK is commonly changed without being based on the time t1 and/or t2 between the timing of receiving the common DCI and the original HARQ timing, the transmission timing of HARQ-ACK can be commonly controlled between user terminals sharing the common DCI. In addition, since it is not necessary to include the control information in each of the individual DCIs that schedule data for each user, overhead can be reduced.

<Dedicated Control>

Figure 9:
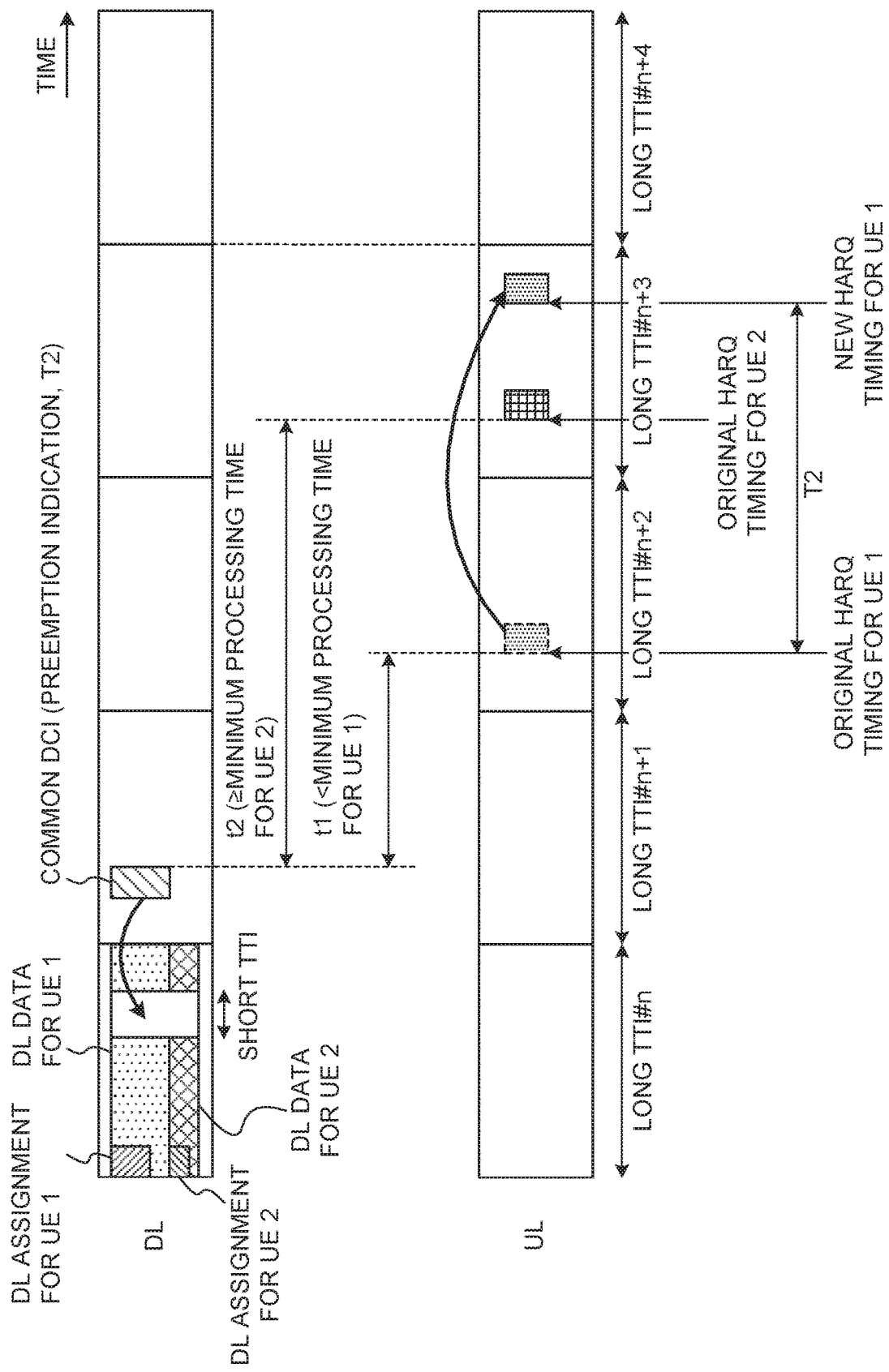
FIG. 9 is a diagram to show an example of dedicated control of HARQ timing according to a fourth example.

FIG. 9 is a diagram to show an example of dedicated control of HARQ timing according to a fourth example. FIG. 9 differs from FIG. 8 in that the user terminals 1 and 2 control HARQ timing based on time t1 and/or t2 between the timing of receiving common DCI and the original HARQ timing, respectively. Referring to FIG. 9, differences from FIG. 8 will be primarily described below.

In FIG. 9, the time t1 from the timing at which the common DCI is received to the original HARQ timing in the user terminal 1 is shorter than the minimum processing time for the user terminal 1 (here, 2 long TTIs). Therefore, the user terminal 1 delays the timing of transmitting HARQ-ACK from long TTI #n+2 to long TTI #n+3, based on offset T2 indicated by transmission timing information in common DCI.

Whereas, in FIG. 9, the time t2 from the timing at which the common DCI is received to the original HARQ timing in the user terminal 2 is equal to or longer than the minimum processing time (here, 2 long TTIs) for the user terminal 2. In this case, the user terminal 2 may keep long TTI #n+3, which is the transmission timing of the original HARQ-ACK, without delaying the HARQ-ACK transmission timing.

In FIG. 9, since the timing of transmitting the HARQ-ACK is individually changed based on the time t1 and/or t2 between the timing of receiving the common DCI and the original HARQ timing, the transmission timing of HARQ-ACK can be flexibly controlled between user terminals sharing the common DCI.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 10:
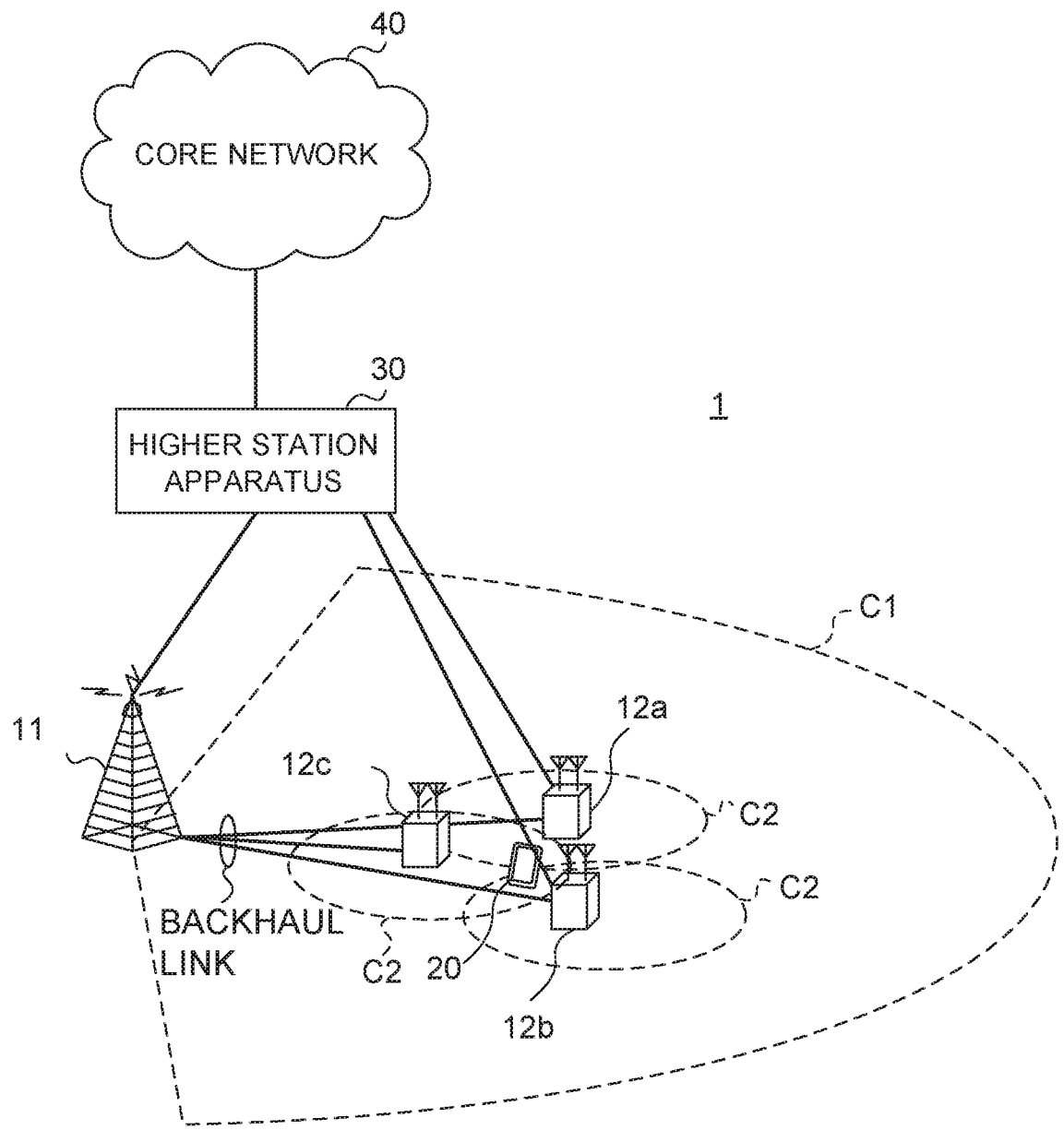
FIG. 10 is a diagram to show an example of a schematic structure of a radio communication system according to the present embodiment.

FIG. 10 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 10 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell, either one of the long TTI and the short TTI may be applied, or both the long TTI and the short TTI may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH (Physical Downlink Shared Channel), also referred to as a DL shared channel and/or the like), which is used by each user terminal 20 on a shared basis, a broadcast channel (PBCH (Physical Broadcast Channel)), L1/L2 control channels and so on are used as DL channels. At least one of user data, higher layer control information and SIB s (System Information Blocks) is communicated in the PDSCH. Also, the MIB (Master Information Block) is communicated in the PBCH.

The L1/L2 control channels include DL control channels (PDCCH (Physical Downlink Control Channel), EPDCCH (Enhanced Physical Downlink Control Channel), etc.)), a PCFICH (Physical Control Format Indicator Channel), a PHICH (Physical Hybrid-ARQ Indicator Channel) and so on. Downlink control information (DCI), including PDSCH and PUSCH scheduling information, is communicated by the PDCCH and/or the EPDCCH. The number of OFDM symbols to use for the PDCCH is communicated by the PCFICH. The EPDCCH is frequency-division-multiplexed with the PDSCH and used to communicate DCI and so on, like the PDCCH.

In the radio communication system 1, a UL data channel (PUSCH (Physical Uplink Shared Channel), also referred to as a UL shared channel and/or the like), which is used by each user terminal 20 on a shared basis, an UL control channel (PUCCH (Physical Uplink Control Channel)), a random access channel (PRACH (Physical Random Access Channel)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

<Radio Base Station>

Figure 11:
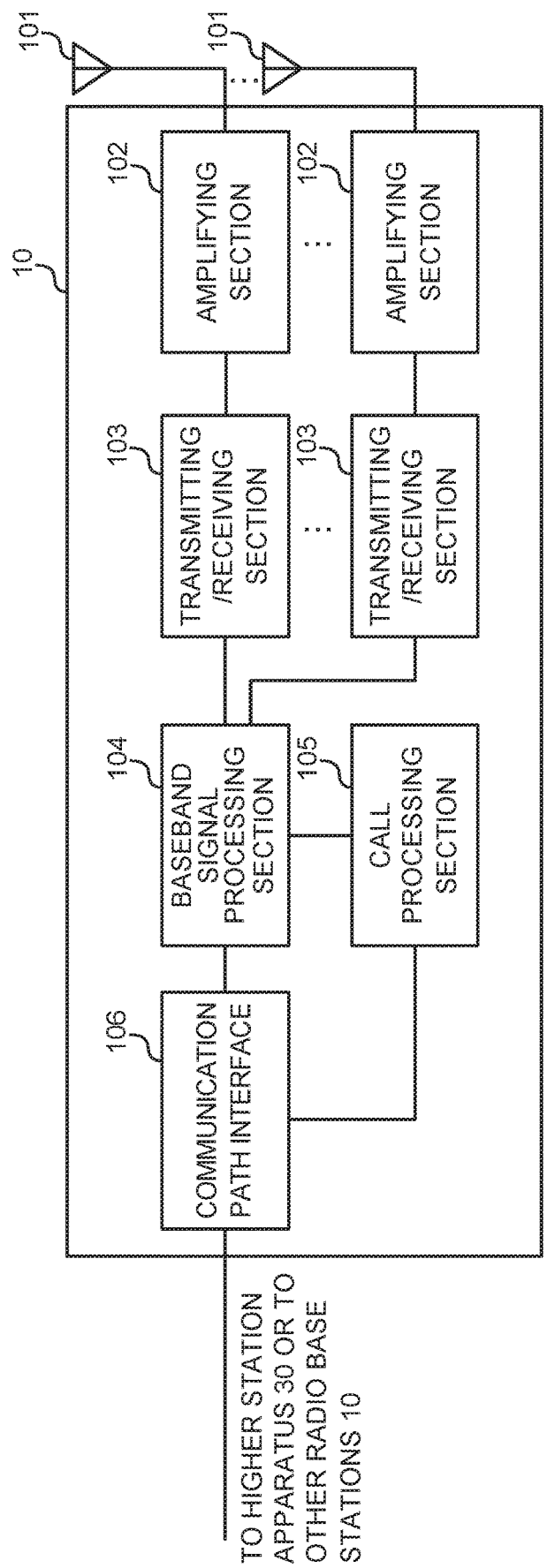
FIG. 11 is a diagram to show an example of an overall structure of a radio base station according to the present embodiment.

FIG. 11 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving sections 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

Also, transmitting/receiving sections 103 transmit DL signals (for example, at least one of DCI (includes at least one of DL assignment, UL grant and common DCI), DL data and preemption indication) and receive UL signals (for example, UL data, UCI, etc.) in long TTI (first TTI) and/or short TTI (second TTI).

Figure 12:
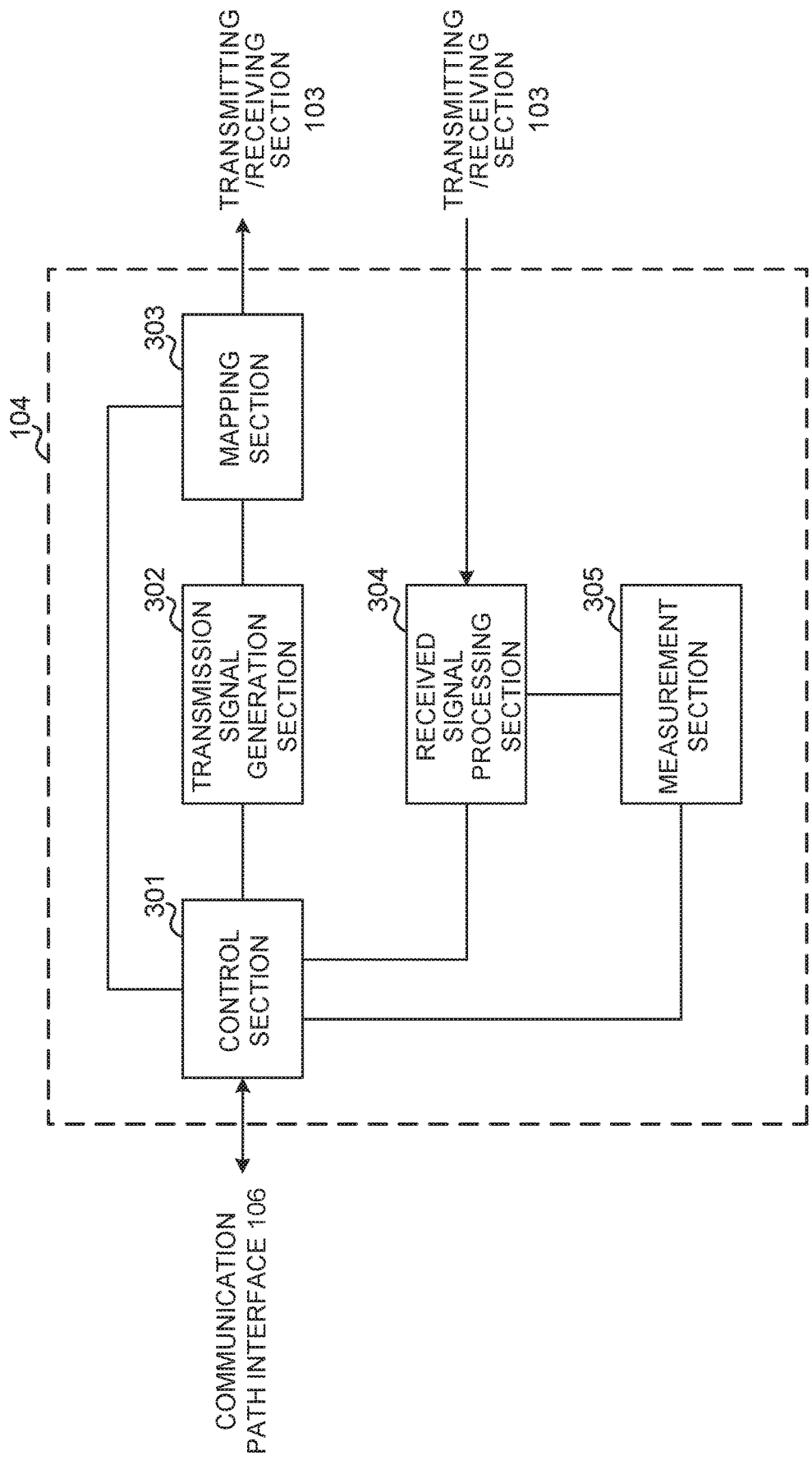
FIG. 12 is a diagram to show an example of a functional structure of a radio base station according to the present embodiment.

FIG. 12 is a diagram to show an exemplary functional structure of a radio base station according to present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 at least has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 performs long TTI and/or short TTI scheduling. The control section 301 may control the transmission process (for example, coding, modulation, transmission, etc.) of DCI using DL control channel (also referred to as "scheduling control channel," etc.) in long TTI and/or short TTI.

The control section 301 also controls transmission of DL signals and/or reception of UL signals in long TTIs and/or short TTIs. To be more specific, the control section 301 may control the DL data transmission process (for example, coding, modulation, mapping, transmission, etc.) and/or the UL data receiving process (for example, receipt, demapping, demodulation, decoding, etc.) in long TTI and/or short TTI.

Also, the control section 301 controls transmission of retransmitting data of DL data. To be more specific, when a part of DL data of long TTI is preempted (punctured) by transmission of short TTI, the control section 301 may control transmission of retransmitting data without delivery acknowledgement information (HARQ-ACK) from the user terminal 20. Note that, DL data may be comprised of transport blocks (TB) including one or more code blocks (CB), and data to be retransmitted may include at least a part of the DL data (for example, this CB whole, part to be preempted, or whole TB).

The control section 301 also controls transmission of preemption indication. In the first example, a radio base station controls transmission timing of preemption indication based on capability information (processing time of the above first and second types) reported from a user terminal. To be more specific, the radio base station may transmit a preemption indication from HARQ timing determined based on the first type of processing time earlier than the timing before the second type processing time (reference timing). Meanwhile, after the reference timing, the radio base station stops transmitting the preemption indication.

The control section 301 can be constituted by a controller, a control circuit or control apparatus that can be described based on general understanding of the technical field to which the present invention pertains.

The transmission signal generation section 302 generates a DL signal (including DL data, DCI and preemption indication) based on the command from the control section 301 and outputs the DL signal to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for UL signals transmitted from the user terminal 20. To be more specific, the received signal processing section 304 may output the received signals and/or the signals after receiving processes to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, RSRP (Reference Signal Received Power)), the received quality (for example, RSRQ (Reference Signal Received Quality)), channel states and so on of the received signals. The measurement results may be output to the control section 301.

(User Terminal)

Figure 13:
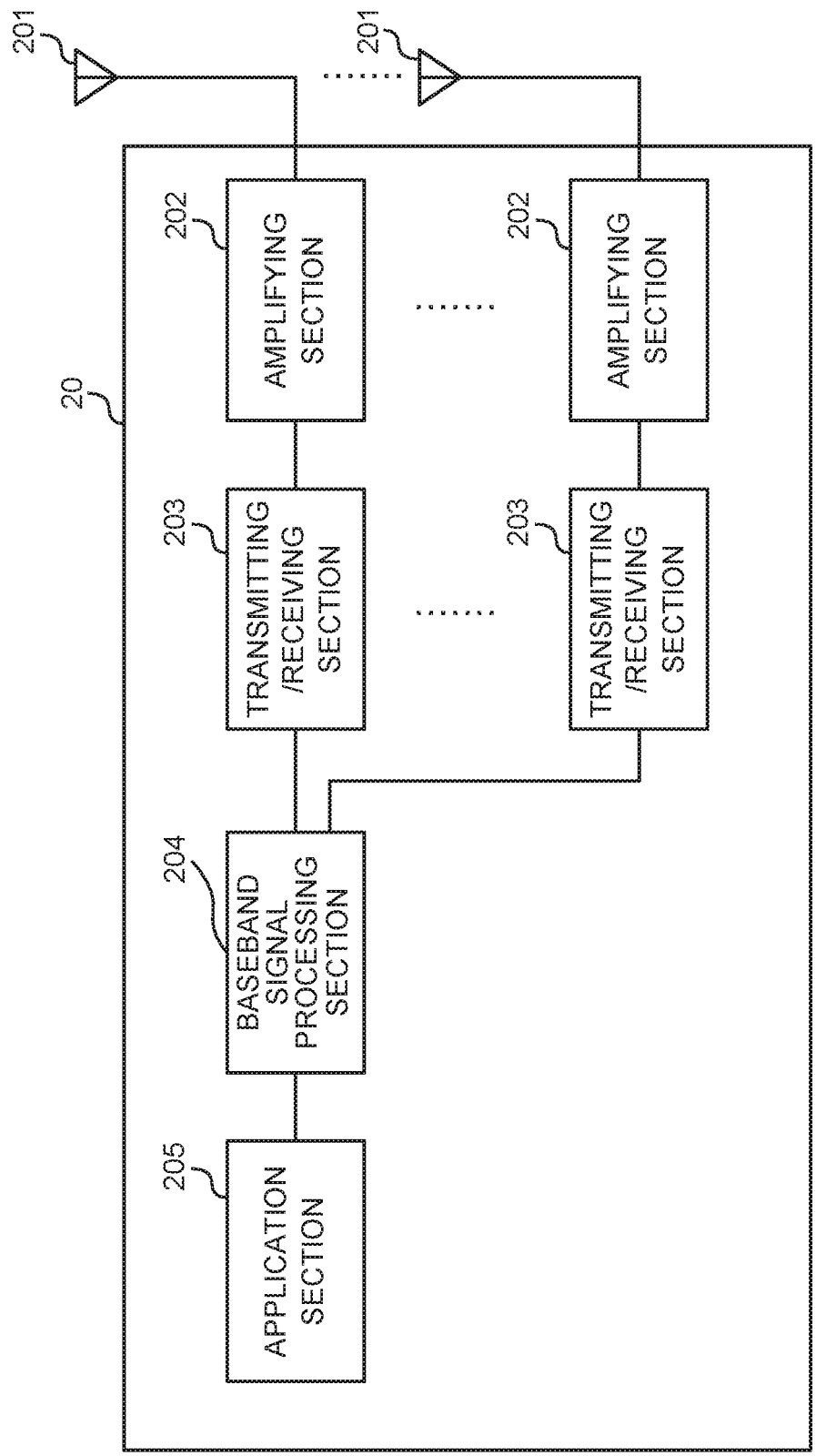
FIG. 13 is a diagram to show an example of an overall structure of a user terminal according to the present embodiment.
Figure 14:
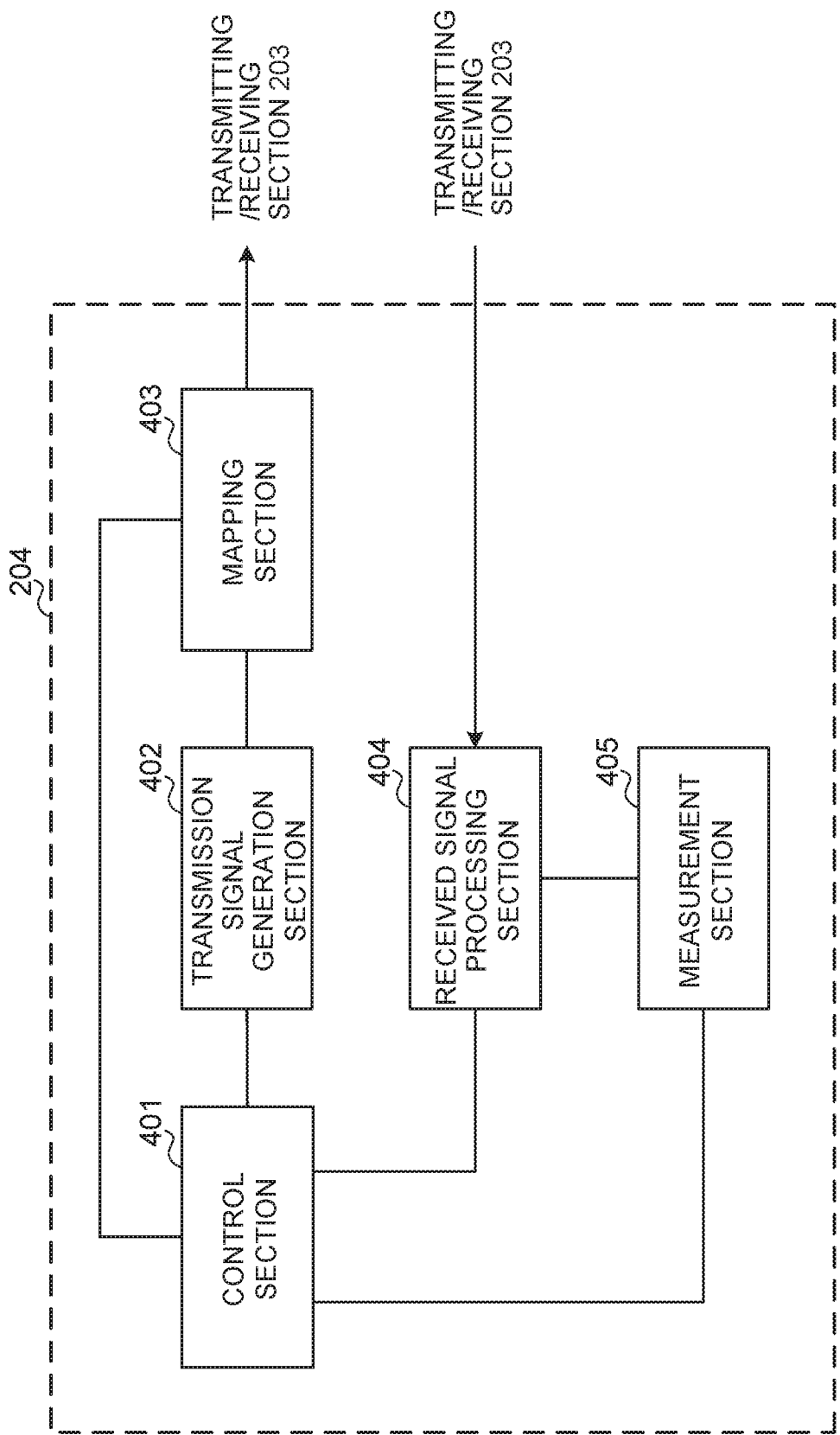
FIG. 14 is a diagram to show an example of a functional structure of a user terminal according to the present embodiment.

FIG. 13 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, an FFT process, error correction decoding, a retransmission control receiving process and so on. The DL data is forwarded to the application section 205. The application section 205 performs processes related to higher layers above the physical layer and the MAC layer, and so on. Furthermore, in the downlink data, broadcast information is also forwarded to the application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (for example, DL retransmission control information, channel state information, etc.) is also subjected to channel encoding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, DCI, DL data, preemption indication, etc.) in long TTI (first TTI) and/or short TTI (second TTI). Also, the transmitting/receiving sections 203 transmit UL signals (for example, UL data, UCI, etc.) in long TTIs and/or short TTIs.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

FIG. 13 is a diagram to show an exemplary functional structure of a user terminal according to present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

To be more specific, the control section 401 may monitor (blind decoding) the DL control channel for long TTI and/or short TTI, and detect DCI for long TTI and/or short TTI directed to the user terminal 20.

The control section 401 also controls transmission of DL signals and/or reception of UL signals in long TTIs and/or short TTIs. To be more specific, the control section 401 may control the DL data transmission process (for example, coding, modulation, mapping, transmission, etc.) and/or the UL data receiving process (for example, receipt, demapping, demodulation, decoding, etc.) in long TTI and/or short TTI.

Also, the control section 401 controls transmission of retransmitting data of DL data. To be more specific, the control section 401 may control demodulation and/or decoding of DL data based on the preemption indication from the radio base station 10. Also, the control section 401 may control the generation of HARQ-ACK based on the recovery (demodulation and/or decoding) result of DL data.

For example, the control section 401 may replace CIIrs of data fields, that the preemption indication specifies among DL data received in long TTI #n, with 0, and demodulate (and/or decode) the DL data. Also, when the preemption indication is received, the control section 401 may recover DL data based on retransmission data transmitted from the radio base station 10 without HARQ-ACK from the user terminal 20.

Also, the control section 401 may control transmission timing of HARQ-ACK. In addition, the control section 401 may perform a control to transmit HARQ-ACK at a transmission timing (HARQ timing) indicated by the predetermined field value in the DCI, even if the preemption indication (command information) is received (first example).

Furthermore, the control section 401 may perform a control to transmit HARQ-ACK at a transmission timing that is later than the transmission timing indicated by the predetermined field value in the DCI, even if the preemption indication is received (second example).

Also, when the available processing time after receiving the preemption indication is equal to or more than the minimum processing time (2nd type processing time), the control section 401 may transmit HARQ-ACK at a transmission timing indicated by a predetermined field value in DCI, and when the available processing time is less than the minimum processing time, the control section 401 may transmit the HARQ-ACK at a transmission timing later than the transmission timing (third example).

The control section 401 may also specify a transmission timing later than the transmission timing indicated by the predetermined field value in the DCI, based on at least one of preemption indication, DCI that is common to one or more user terminals, and DCI that is used to retransmit at least part of the DL data (first to third examples of control according to the second example).

Also, when the common DCI used as a preemption indication is used, the control section 401 may delay the transmission timing of HARQ-ACK based on the offset included in the common DCI regardless of the processing time after receiving the preemption indication (common control of the 4th example). Alternatively, the control section 401 may delay the transmission timing of HARQ-ACK based on the processing time after receiving the preemption indication (the fourth example dedicated control).

The control section 401 can be constituted by a controller, a control circuit or control apparatus that can be described based on general understanding of the technical field to which the present invention pertains.

The transmission signal generation section 402 generates retransmission control information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generation circuit or signal generation apparatus that can be described based on general understanding of the technical field to which the present invention pertains.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs a receiving process (for example, demapping, demodulation, decoding, etc.) for the DL signal (for example, DL data, DCI, preemption indication, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC. Also, the measurement section 405 may perform channel estimation using the first and second reference signals and output the estimation result to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire and/or wireless, for example) and using these multiple pieces of apparatus.

Figure 15:
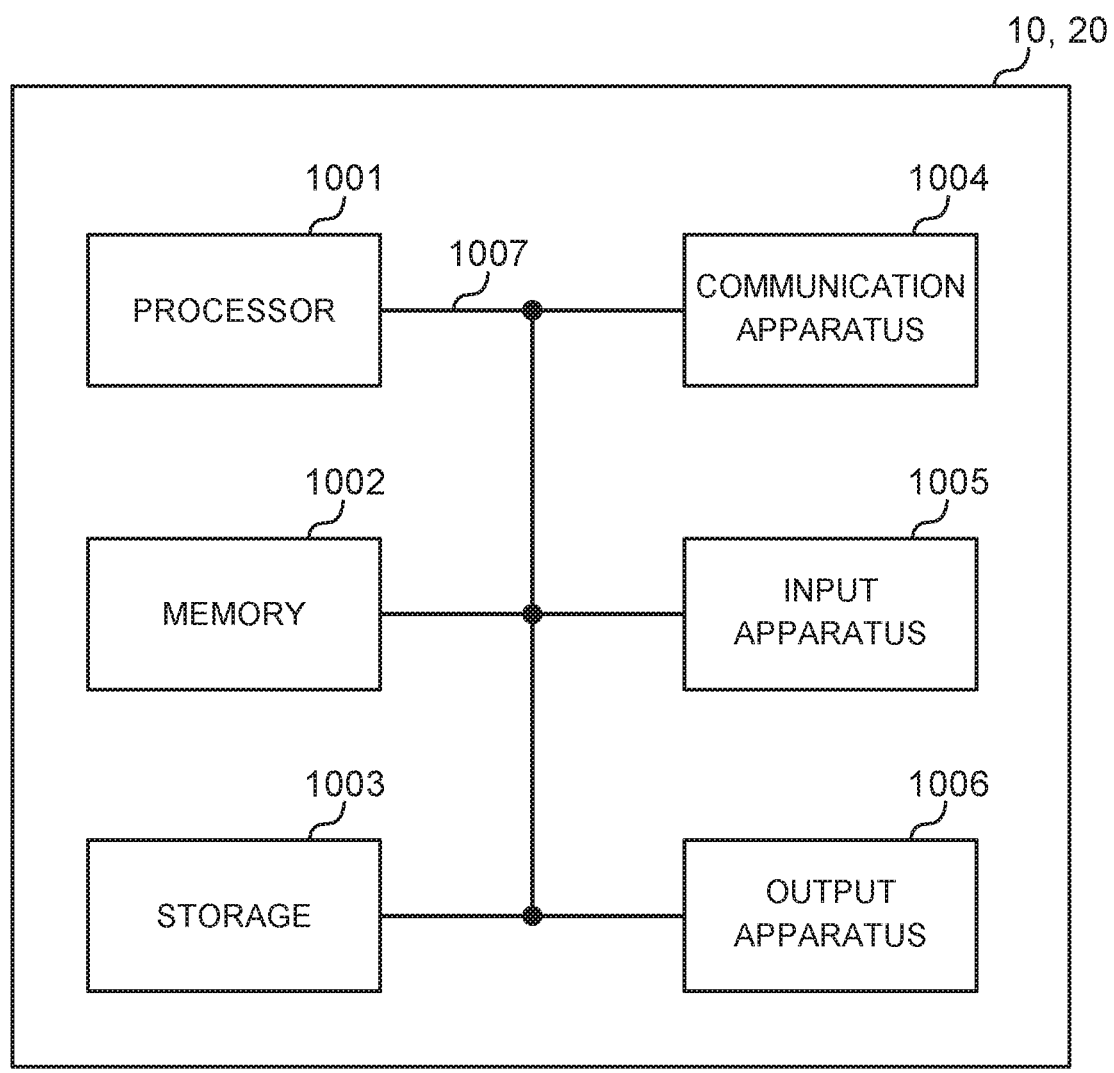
FIG. 15 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 15 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by a least one of allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of 1 or more symbols in the time domain. Also, a mini-slot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and/or transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rels. 8 to 12)," a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices.

In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.16 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination thereof. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives downlink (DL) data based on downlink control information (DCI) in a first transmission time interval (TTI);
a transmitter that transmits capability information indicating whether the terminal can receive a preemption indication; and
a processor that controls timing of transmitting a delivery acknowledgement information of the DL data when indication information regarding preemption of the first TTI by a second TTI shorter than the first TTI is received in the receiver,
wherein the transmitter transmits the delivery acknowledgement information.

2. The terminal according to claim 1, wherein, even when the indication information is received, the transmitter transmits the delivery acknowledgement information at a transmission timing indicated by a predetermined field value in the DCI.

3. The terminal according to claim 1, wherein, when the indication information is received, the transmitter transmits the delivery acknowledgement information at a transmission timing later than a transmission timing indicated by a predetermined field value in the DCI.

4. The terminal according to claim 1, wherein the processor transmits the delivery acknowledgement information at a transmission timing indicated by a predetermined field value in the DCI when a processing time that is available after the indication information is received is equal to or more than a minimum processing time, and transmits the delivery acknowledgement information at a transmission timing later than the transmission timing when the available processing time is less than the minimum processing time.

5. The terminal according to claim 3, wherein the processor specifies the later transmission timing based on at least one of the indication information, DCI that is common to one or more terminals, and DCI that is used to retransmit at least part of the DL data.

6. A radio communication method for a terminal, comprising:
- receiving downlink (DL) data based on downlink control information (DCI) in a first transmission time interval (TTI);
- transmitting capability information indicating whether the terminal can receive a preemption indication; and
- controlling timing of transmitting a delivery acknowledgement information of the DL data when indication information regarding preemption of the first TTI by a second TTI shorter than the first TTI is received; and
- transmitting the delivery acknowledgement information.

7. The terminal according to claim 4, wherein the processor specifies the later transmission timing based on at least one of the indication information, DCI that is common to one or more terminals, and DCI that is used to retransmit at least part of the DL data.

* * * * *